United States Patent
Li et al.

(10) Patent No.: US 8,233,939 B2
(45) Date of Patent: Jul. 31, 2012

(54) MULTIUSER SECTOR MICRO DIVERSITY SYSTEM

(75) Inventors: Li Li, Wuhan (CN); Clark Chen, Beijing (CN); Guangjie Li, Beijing (CN); May Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1157 days.

(21) Appl. No.: 12/059,375

(22) Filed: Mar. 31, 2008

(65) Prior Publication Data

US 2009/0245153 A1 Oct. 1, 2009

(51) Int. Cl.
*H04B 1/38* (2006.01)
*H04B 15/00* (2006.01)
*H04W 4/00* (2009.01)

(52) U.S. Cl. ............ 455/561; 455/422.1; 455/450; 455/509; 455/500; 455/502; 370/329

(58) Field of Classification Search .......... 455/312, 455/69, 101, 422.1, 424, 425, 450, 451, 452.1, 455/452.2, 456.1, 456.5, 456.6, 509, 512, 455/513, 524, 525, 560, 561, 562.1, 502; 375/135–136, 146–147, 267, 299, 341, 347, 375/349; 370/338, 203–210, 329

See application file for complete search history.

(56) References Cited

U.S. PATENT DOCUMENTS

| 7,697,622 | B2 * | 4/2010 | Han et al. ............... 375/260 |
| 7,907,677 | B2 | 3/2011 | Li et al. |
| 2007/0183380 | A1 * | 8/2007 | Rensburg et al. ......... 370/338 |
| 2007/0263746 | A1 * | 11/2007 | Son ........................... 375/267 |
| 2007/0274411 | A1 * | 11/2007 | Lee et al. .................. 375/267 |
| 2008/0096488 | A1 * | 4/2008 | Cho et al. .................... 455/69 |
| 2009/0274074 | A1 * | 11/2009 | Astely ....................... 370/280 |
| 2010/0254474 | A1 * | 10/2010 | Gomadam et al. ....... 375/267 |
| 2010/0311430 | A1 * | 12/2010 | Katayama et al. ....... 455/450 |
| 2011/0009148 | A1 * | 1/2011 | Kotecha .................... 455/513 |
| 2011/0096877 | A1 * | 4/2011 | Kimura et al. ............ 375/347 |

OTHER PUBLICATIONS

Brandao et al., "Base station macro-diversity combining merge cells in mobile systems," IEEE Electronics Letters, Jan. 5, 1995, vol. 31, No. 1, pp. 12-13, Middletown, PA.
3GPP, TSGR1#3(99)187, Motorola, "Improvements to Site Selection Diversity Transmission (SSDT)," TSG-RAN Working Group 1 meeting #3, Mar. 22-26, 1999, 5 pages, Stockholm, Sweeden.
EGPP TSG-RAN WG1 #46big, R1-062778, "Further System-Level Simulation Results for Downlink Inter-Sector Macro Diversity," Chunghwa Telecom Laboratories (CHTTL), 6.6.4, 5 pages, Oct. 13, 2006, Seoul, Korea.
Furukawa et al., "SSDT—Site Selection Diversity Transmission Power Control for CDMA Forward Link," IEEE Journal on Selected Areas in Communications, vol. 18, No. 8, Aug. 2000, pp. 1546-1554.
Morimoto et al., "Experiments on Fast Sector Selection with Entire-Bandwidth Assignment in Forward Link for OFCDM Broadband Packet Wireless Access," IEEE 2004, IP Radio Network Development Department, NTT DoCoMo, Inc., pp. 1689-1694, Kanagawa-ken, Japan.

(Continued)

*Primary Examiner* — Pablo Tran
(74) *Attorney, Agent, or Firm* — Schwabe, Williamson & Wyatt, P.C.

(57) ABSTRACT

Embodiments of methods and apparatus for a multiuser sector micro diversity system are described herein. Other embodiments may be described and claimed.

11 Claims, 12 Drawing Sheets

OTHER PUBLICATIONS

3GPP TR 25.814, V7.1.0, 3rd Generation Partnership Project, "Technical Specification Group Radio Access Network; Physical layer aspects for evolved Universal Terrestrial Radio Access (UTRA)," Release 7, (Sep. 2006), 132 pages.

3GPP TSG RAN WG1 Ad Hoc on LTE, R1-050615, NTT DoCoMo, 4.3, "Investigations on Inter-Sector Diversity in Evolved UTRA Downlink," Jun. 20-21, 2005, Sophia Antipolis, France, 7 pages.

* cited by examiner

FIG. 7

| CQI (dB) | user 1 | user 2 | user 3 | user 4 | user 5 |
|---|---|---|---|---|---|
| stream 1 | 1 | 20 | 12 | 2 | 4 |
| stream 2 | 3 | 15 | 1.5 | 1 | 0 |

FIG. 8

| CQI (dB) | user 1 | user 2 | user 3 | user 4 | user 5 |
|---|---|---|---|---|---|
| stream 1 | 1 | -3 | 12 | 2 | 4 |
| stream 2 | 3 | -1 | 1.5 | 1 | 0 |

MULTIUSER SECTOR MICRO DIVERSITY SYSTEM

FIELD OF THE INVENTION

The field of invention relates generally to a multiuser sector micro diversity system and more specifically but not exclusively relates to a wireless system, including a scheduling system, for transmitting and receiving signals using a multiple input multiple output micro station to ameliorate fading and/or interference of the signals while effectively enhancing throughput of the signals in the wireless system.

BACKGROUND INFORMATION

The Institute of Electrical and Electronics Engineers (IEEE) has adopted a set of standards for wireless local area networks (LANs), known as 802.11. Wireless products satisfying 802.11a, 802.11b, and 802.11g, as well as 802.16, are currently on the market, for example.

Recently, an 802.11n standard, known also as the Enhancement for High Throughput wireless standard, has emerged. Under the 802.11n standard, transmitters and receivers each have multiple antennas for transmission and reception of data. As a multiple input, multiple output (MIMO) technology, 802.11n is designed to coordinate multiple simultaneous radio signals, and is expected to support a bandwidth of greater that 100 megabits per second (Mbps). An 802.16m standard has been initiated, which supports the International Telecommunications Union (ITU) IMT-ADVANCE (also known as "4G"). Advanced MIMO is essentially technology to fulfill the target requirement of IMT-ADVANCE.

Single-user MIMO, or SU-MIMO, involves communications between a single base transceiver station (BS) and a mobile station (MS) or subscriber station (SS). Multiple-user MIMO, or MU-MIMO, is concerned with communication between the BS and multiple MSs or SSs. During the uplink, multiple MSs transmit data to the BS; during the downlink, the BS transmits signals to multiple MSs. MU-MIMO may benefit from both multi-user diversity and spatial diversity

BRIEF DESCRIPTION OF THE DRAWINGS

The present invention is illustrated by way of example and not as a limitation in the figures of the accompanying drawings, in which:

FIG. 7 and FIG. 8 are tables illustrating single-user and multiple-user MIMO, respectively.

DETAILED DESCRIPTION

Embodiments of methods and systems for using sector micro diversity (SMD) in a multi-user multiple input multiple output (MU-MIMO) environment are described herein. In the following description, numerous specific details are set forth such as a description of a use of SMD to combat fading and interference in a wireless network to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

It would be an advance in the art to increase data throughput in a MU-MIMO wireless network, particularly for users located at or near boundary regions of sectors formed as a result of base transceiver station antenna configuration and orientation. Macro diversity techniques currently used to combat fading and interference at sector boundaries involve the use of multiple base transceiver stations. Use of these diversity techniques require low latency communications between the base transceiver stations while providing for synchronous signaling between the base transceiver stations to provide downstream subscriber stations with synchronous data signals from the multiple base transceiver stations. Providing for microdiversity system and methods allows one or more subscriber stations to communicate using synchronous data signals from a single base transceiver stations using a plurality of sectors created by antennas that are all co-located and controlled by the same base transceiver station. As a result, latency issues inherent in macro diversity techniques are avoided and a MU-MIMO user, particularly a MU-MIMO subscriber station near a sector boundary, may enjoy increased data throughput while avoiding fading and interference issues.

Figure 1:
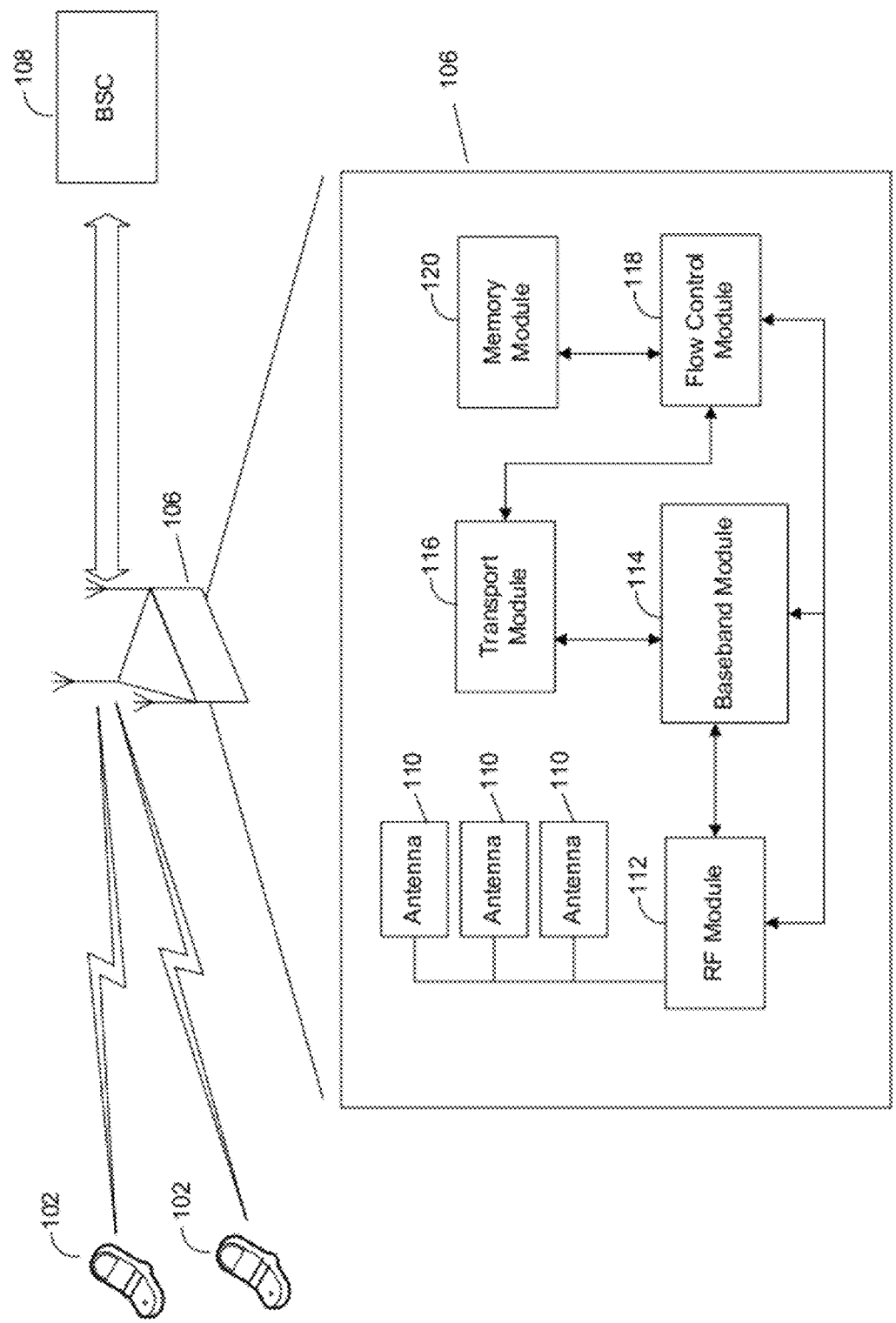
FIG. 1 is an illustration of a base transceiver station in communication with a base station controller and two subscriber stations to improve a reliability of wireless communications in accordance with the present invention.

Turning now to the figures, FIG. 1 illustrates one embodiment of a wireless system that includes a base station controller (BSC) (element 108) operated by a service provider in communication with one or more subscriber stations (SS) (elements 102 and 104) through a base transceiver station (element 106). The BSC (element 108) may be a controller for and be in communication with one or more base transceiver stations (element 106), or base station (BS). Similarly, the base transceiver station (element 106) may be in communication with one or more SS (elements 102 and 104).

A subscriber station (element 104) is generally illustrative of various types of mobile wireless devices, such as cellular phones, personal digital assistants (PDAs), pocket PCs, handheld computer devices, etc. The base transceiver station (element 106) may comprise several elements to receive and transmit one or more flows from and to one or more subscriber stations. A flow may be a stream of data packets transferred real-time using a wireless system, such as a base transceiver station or a subscriber station, though the embodiment is not so limited. A data packet may be any block of data, either fixed or variable in size.

The flow may be received and transmitted by the base transceiver station (element 106) using an antenna (element 110), which may be coupled to a radio frequency (RF) module (element 112). The RF module (element 112) may include radio hardware to support wireless communications using radio signals and corresponding protocols defined by one or more wireless standards. For example, if the SS (element 104) comprises a cellular phone, the RF interface would include radio hardware to support cellular-based communications using an appropriate cellular standard such as a general packet radio system (GPRS), enhanced data rates for global evolution (EDGE), or third-generation wireless (3G), though the embodiment is not so limited. In other embodiments, other wireless communication standards may be employed, such as but not limited to communications defined by the Institute of Electrical Institute of Electrical and Electronic Engineers (IEEE) 802.11, Wireless Fidelity (Wi-Fi) and IEEE 802.16 Worldwide Interoperability for Microwave Access (WiMAX) suites of standards. The RF module (element 112) may comprise an amplifier, an analog to digital controller, a digital to analog controller, and one or more filters to convert radio signals and encoded data signals. The modules described herein can be hardware, software, firmware or any combination thereof.

The RF module (element 112), may be coupled to a baseband module (element 114). The baseband module (element 114) may comprise encoding, decoding, modulation, and demodulation hardware. A transport module (element 116) may be coupled to the baseband module (element 114) to transfer the flow to a wired terrestrial network. A flow control agent (element 118) may be used to coordinate and schedule the flows through the base transceiver station (element 106) using software or firmware, but the embodiment is not so limited.

In one embodiment, the flow control agent (element 118) may be an application-specific integrated circuit (ASIC) that is specifically designed to prioritize and schedule the flows. In another embodiment, the flow control agent (element 118) may comprise a microprocessor, a microcontroller, or a digital signal processor, but the embodiment is not so limited. The flow control agent (element 118) may be coupled to a memory module (element 120). The memory module (element 120) may be a cache memory embedded on the same chip with the processor core, or alternatively, be a memory storage device such as a random access memory (RAM) or a non-volatile memory that is separate from the processing device.

Figure 2:
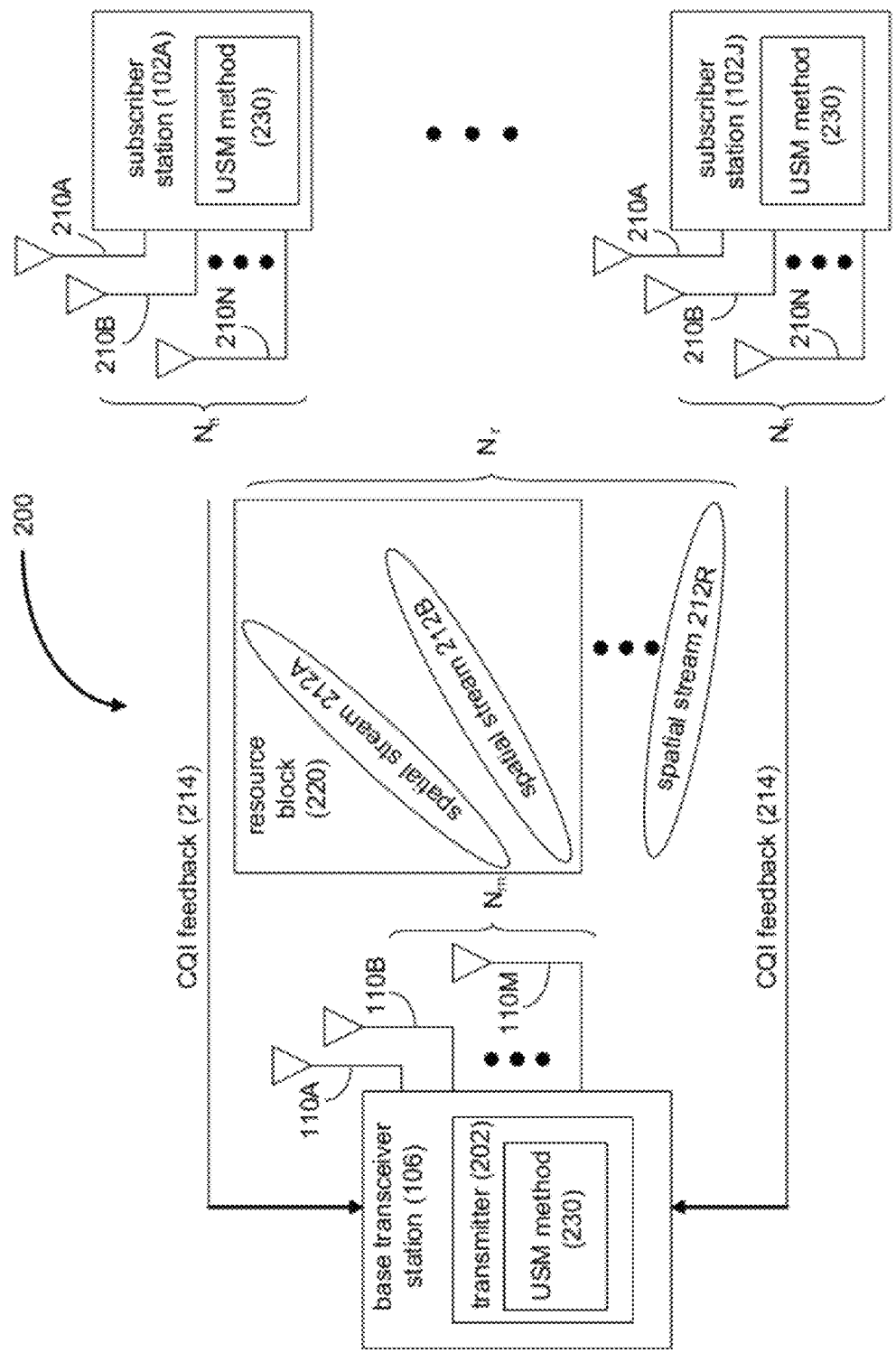
FIG. 2 is a block diagram of a unified open loop single user/multiple user (USM) system and method.

FIG. 2 is a diagram of a unified open loop single user/multiple user (USM) system 200, according to some embodiments. The USM system 200 consists of a base transceiver station 106 and J subscriber stations (receivers) 102A, ..., 102J (collectively, subscriber stations 102), each of which has multiple antennas 110, 210. The base transceiver station 106 also comprises a transmitter 202. The base transceiver station 106 has m antennas 110A, 110B, ..., 110M (collectively base transceiver station antennas 110). The subscriber stations 102 each have n antennas 210A, 210B, ..., 210N (collectively, subscriber station antennas 210). In the USM system 200, the base transceiver station antenna number $N_m$, is larger than the receiver antenna number, $N_n$, for each subscriber station 102. Stated mathematically, $N_m > N_n$. The base transceiver station 106 generates a resource block 220, which may consist of multiple spatial streams 212.

Each subscriber station 102 transmits channel quality indicator (CQI) feedback 214, or feedback channel, to the base transceiver station 106. In the USM system 200, the base transceiver station 106 transmits multiple fixed or semi-static spatial streams 212A, 212B, ..., 212R (collectively, spatial streams 212) in each resource block (not shown). Each resource block may have different spatial streams 212. The spatial streams 212 may be scheduled to multiple users or to a single user, according to the CQI feedback 214 received from each subscriber station 102 in a unified manner, with no single user/multiple-user mode adaptation needed. The terms SS and user refer to the same entity 102 shown in FIG. 1, and these terms are used interchangeably throughout the detailed description.

The USM system 200 employs a USM method 230 according to some embodiments. The USM method 230 is an algorithm that enables the multiple-antenna subscribers stations 102, as depicted in FIG. 1, using spatial streams 212 use the USM method 230 as shown in FIG. 2. The USM method 230 may consist of software, hardware, or a combination of software and hardware.

In addition to the number of antennas, the number of supported streams, given by $N_s$, and the number of users allocated to a sub-channel, given by $N_u$, are relevant to signal transmission, with there being at least one user and one or more sub-channels. Stated mathematically, $1 \leq N_u \leq N_s$. The $N_s$ streams of data to be transmitted may be given by the following equation:

$$S = (s_0 s_1 \ldots s_{Ns-1}) \qquad (1)$$

Each data stream may be allocated to $N_u$ users, with $1 \leq N_u \leq N_s$. With $u_i$ defined to be the number of allocated streams for the $i^{th}$ user, the following equation results:

$$\sum_{i=0}^{Nu-1} u_i = \text{Rank} \leq N_s$$

Depending on the different stream allocation, several modes may exist: single-user mode, multiple-user mode, and hybrid mode. Each of these modes is described in turn.

Single-user Mode (Mode 1)

In single-user mode, $N_u = 1$, meaning that all of the $N_s$ streams are allocated to one user. For example, if $N_m = 4$, $N_s = 4$, $N_u = 1$, $u_0 = 1$ (rank=1), $S = (s_0 \ 0 \ \ldots \ 0)$, the result is a single-user rank 1 case, which is useful for an edge-conditioned or bad channel-conditioned user to improve the channel quality. In cellular systems, the cell edge user typically experiences more interference, relative to the other cell users, with a lower performance resulting from this interference. If $N_m = 4$, $N_s = 4$, $N_u = 1$, $u_0 = 4$ (rank=4), $S = (s_0 \ s_1 \ \ldots \ s_3)$, the result is a single-user "full rank" case, which is a spatially multiplexed MIMO situation. Other cases are "deficient rank" spatial division multiplexing (SDM) for a single user. Rank is, at most, equal to the number of supported streams, $N_s$. Stated mathematically, rank $\leq N_s$.

Multiple-user Mode (Mode 2)

In multiple-user mode, $N_u = N_s$, and $u_i = 1$ for any user, which means each user is allocated a single spatial stream. This constitutes a spatial division multiple access (SDMA) situation.

Hybrid Mode (Mode 3)

In hybrid mode, $N_u < N_s$ and $N_u \geq 2$. Multiple users are allocated to one sub-channel, and some users have more than one stream.

In the USM method 230 described herein, according to the feedback of CQI and the tradeoff between efficiency and fairness, the uniform scheduler will dynamically decide the total number of streams, $N_s$, as well as the stream allocation pattern for one or more users. As a result, the above three modes will appear, but the probability of each mode occurring is different. When the number of users, $N_u$, is large, most of the cases are characterized as either being multiple-user mode (mode 2) or hybrid mode (mode 3), in which the USM method 230 can obtain the F-T-S (frequency, time, and spatial domain) selective gain efficiently, and can show the advantage of multi-user MIMO over single-user MIMO in single-user mode (mode 1). The USM method 230 thus can implicitly support single-user MIMO (mode 1) and multi-user MIMO (modes 2 and 3) without need of extra signaling and adaptation overhead. The USM method 230, as described herein, may thus be regarded as a unified approach for SU-MIMO and MU-MIMO.

Channel Quality Indicator (CQI)

There exist several kinds of CQI: horizontal spatial multiplexing (HSM) CQI, HSM CQI with serial interference cancellation (HSM+SIC) CQI, and vertical spatial multiplexing (VSM) CQI. Each of these is discussed in turn.

Horizontal Spatial Multiplexing CQI

With horizontal spatial multiplexing CQI, the CQI is calculated assuming each spatial stream is independent. Further, the modulation and coding scheme (MCS) may be different for each stream.

HSM+Serial Interference Cancellation CQI

With horizontal spatial multiplexing with serial interference cancellation CQI, with a serial interference cancellation (SIC) receiver, the interference from the former stream is cancelled, and the spatial streams are detected layer by layer. The channel quality for the latter layer will be increased after the cancellation of interference. The resulting CQI is the CQI after SIC cancellation, and is valid for the spatial stream, except for the first spatial stream.

When the mode is either multi-user or hybrid mode, when using HSM plus SIC CQI in the data detected stage, the receiver must detect the data of other users and then cancel the data.

A SIC receiver may provide better throughout gain compared with a non-SIC receiver. However, the complexity of a SIC receiver is higher than for a non-SIC one. Further, there is a need to detect the signal from other users and cancel the data from other users in multi-user MIMO. Further still, in MU-MIMO, with user selection and stream scheduling, the cross-talk (inter-stream interference, or ISI) is small, and the gain from SIC will decrease.

In some embodiments, the benefits and drawbacks from SIC are evaluated carefully compared with a maximum likelihood detection (MLD) receiver, so as to evaluate the gain of SIC in the multi-user case.

Vertical Spatial Multiplexing CQI

There exists one vertical spatial multiplexing (VSM) channel quality indicator for multiple streams of one user. The modulation and coding scheme (MCS) of each stream belonging to one user are the same.

Two methods may be used to indicate the type of CQI. The first method is to indicate what kind of type is preferred by the subscriber station (SS) when feedback of the corresponding CQI occurs. In the first method, more information bits are employed for feedback, known herein as flexible CQI.

The second method is to decide the CQI type when the CQI channel (CQICH) is established, and to fix the type until an update from the base transceiver station 106 occurs. In this method, known herein as fixed CQI, no extra CQI should be fed back.

For horizontal spatial multiplexing CQI, the subscriber station 102, SS, estimates the channel quality for each spatial stream, assuming equal power allocation between streams, and feeds the estimated channel quality back to the base station transceiver 106, BS. When the BS decides the deficient rank, the power-loading between the stream is utilized (the power of some streams is set to zero). After power loading, the CQI may be estimated by the BS naturally, according to the power-loading factor and the feedbacked CQI. The USM method 230 does not use extra signaling (in case the crosstalk from other streams is much smaller than the interference from the other cell). The other cell is a neighboring interfering cell.

One example is the rank 1 case. In the rank 1 case, all the power is allocated to a single user. Further, the feed-backed CQI estimated assumes an equal power allocation. The CQI is thus scaled according to the power boot factor.

CQI type adaptation from HSM CQI to HSM plus SIC CQI or VSM CQI needs extra feedback because of the big difference between the CQI values.

The USM method 230 aims to explore the gain from F-T-S selective scheduling gain, and preference to the multi-user (mode 2) or hybrid (mode 3) modes, in most cases. The probability of adaptation to VSM CQI is minimal, in some embodiments. Because of the complexity and small gain from the SIC receiver in MU-MIMO, the second CQI method (fixed CQI) is used by the USM method 230, with the SS feeding back the HSM CQI, unless the BS decides to feed-back HSM plus SIC CQI or VSM CQI when the establishment of CQICH takes place.

The USM method 230 utilizes a pre-defined pre-coding matrix, V, to carry multiple streams from multiple users. The multiple stream data are derived from space-time coding, such as space-time block codes (STBC), spatial multiplexing (SM), or space-time trellis codes (STTC), and so on. A V matrix multiplies the data symbol after space-time coding, before being sent to the antenna. The V matrix may be in any form, as long as the matrix has dimension, $N_m = N_s$. The V matrix should be under the constraint of power, and some other issue, such as peak-to-average power ratio (PAPR).

In the USM method 230, the single or multiple streams of data are multiplied by the V matrix, and each column of V forms a spatial stream. In one frame, each sub-channel has a different V matrix.

The purpose of the V matrix is to introduce the fluctuation in the frequency, time, and spatial domains. The fluctuation will benefit the "T-F-S" multi-user diversity, especially in the flat fading channels. However, the frequent change of the V matrix introduces the frequent CQI feedback from the SS. In some embodiments, the V matrix is maintained for a period, k, to reduce the CQI feedback overhead. (A fixed V matrix may be thought of as a special case of a periodically changing V matrix, in which the period is infinite.)

Figure 3:
FIG. 3 is a diagram illustrating the V matrix in different frames and sub-channels, used by the USM method of FIG. 2.

FIG. 3 is a diagram illustrating the V matrix 300 in different frames and sub-channels, used by the USM method 230, according to some embodiments. FIG. 3 shows that, in different resource blocks, different V matrixes are used for the preceding, and changing slowing in time (semi-static) matrix. In the first sub-channel, sub-channel k, the $V_k$ matrix is used for each frame; in the next sub-channel, sub-channel k+1, a matrix, $V_{k+1}$, is used for each frame; and so on. Thus, each sub-channel may have a different pre-coding matrix. The sub-channels in FIG. 3 are in the frequency domain while the frames are in the time domain.

There are two kinds of MU-MIMO: open-loop and closed loop. In close-loop MU-MIMO, the transmitter knows the channel state information. In open-loop MU-MIMO, the transmitter does not know the channel state information. The USM method 230 is a open-loop MU-MIMO algorithm.

A different open-loop space-time coding (STC) introduces a different form of open-loop MU-MIMO. There are several kinds of existing STC, any of which may be used in open-loop MU-MIMO. In open-loop MU-MIMO, several users may be held in one resource block (RB). Further, each user may use a different or the same STC mode, and each user may take the same number or a different number of spatial streams (rate). (The terms "rank" and "rate" are both used to describe the allocated number of spatial streams, $N_r$.) For example, in a 4×2 configuration (rate=2), two users are allocated as part of a single RB, with one user taking a 2×2 Alamouti code (rate=1), and the other user using SM (transmitting one spatial stream of data (rate=1). An Alamouti code, designed for a two-antenna transmitter, has the following coding matrix:

$$C2 = \begin{bmatrix} s_1 & s_2 \\ -s_2^* & s_1^* \end{bmatrix} \quad (3)$$

where * is the complex conjugate.

Figure 4:
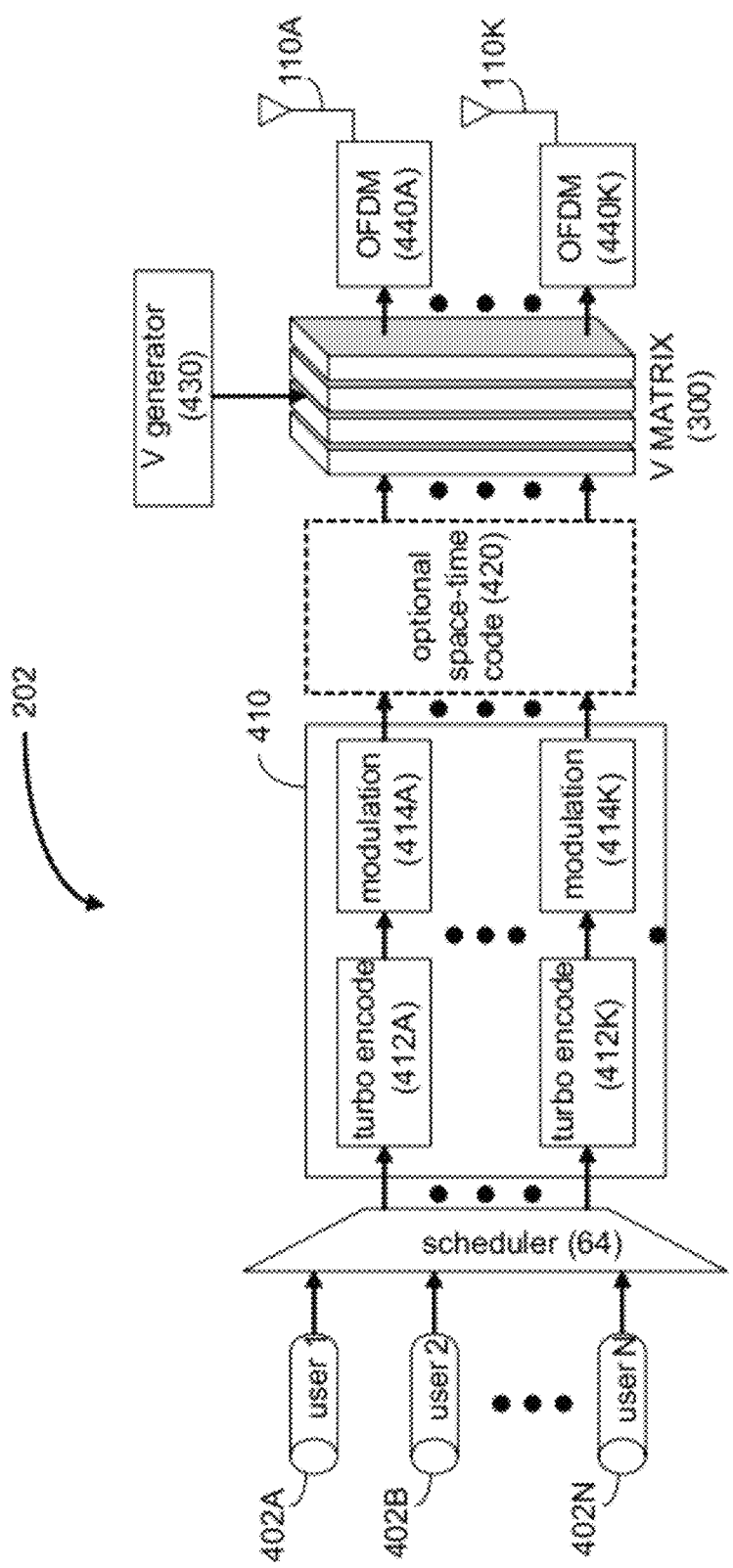
FIG. 4 is a diagram of a transmitter used by the USM method of FIG. 2.

A transmitter 202 employing the USM method 230 is depicted in FIG. 4, according to some embodiments. The transmitter 202 may be part of the base transceiver station 106 in the USM system 200 (FIG. 2). The transmitter 202 transmits data to N users 402A, 402B, ..., 402N (collectively, users 402), with the users 402 being subscriber stations in the network neighborhood of the base transceiver station 106. The transmitter 202 includes a modulation/coding block 410, which includes multiple turbo encoders 412A, ... 412K and multiple modulators 414A, ... 414K, with K being equal to the number of spatial streams. The data streams are then optionally fed into a space-time code (STC) block 420, which do space-time encoding, such as SM, STBC, etc. The resulting data is then fed into the V matrix 300, produced by the V generator 430. In some embodiments, the V generator 430 uses a general transmission equation, such as equation 4, below, to generate the V matrix 300. The V generator 430 may further employ discrete Fourier transform on the data stream, as specified in equation 5, below. Finally, OFDM engines 440A, ..., 440K multiplex the data signals before being transmitted over the air by base station antenna 110A, ..., 110K.

The spatial multiplexing (SM) and space-time block code (STBC) modes, as well as a hybrid of the two modes, are described in the following paragraphs.

Spatial Multiplexing MU-MIMO

Transmitter

The allocated number of streams, $N_r$=rank<=$N_s$, with $N_s$ being the number of supported streams. In spatial multiplexing (SM) mode, the $N_r$ stream data, $S=(s_0 \, s_1 \, \ldots \, s_{N_r-1})$, equation (1), is first multiplexed into $N_s$ streams with some hole if the allocated number of streams, $N_r$, is less than the available number of streams, $N_s(N_r<N_s)$. $S^*=(s_{x_0} s_{x_1} \ldots s_{x_{Ns-1}})$, where $x_i$ defines a map from $N_r$ streams of data to $N_s$ streams, and if $x_i \notin [0: Nr-1]'$, $x_i$=0.

The transmitted signal is represented by the following equation:

$$\begin{pmatrix} a_0 \\ a_1 \\ \vdots \\ a_{Nm-1} \end{pmatrix} = V_{k,t} \times S^* = (p_0 v_0 \quad p_1 v_1 \quad \ldots \quad p_{Ns-1} v_{Ns-1}) S^*, \quad (4)$$

where $p_i$ i∈[0: Ns−1]' is the power-loading factor, and $$\sum_{i=0}^{Ns-1} p_i = P.$$

When with equal power full rank, $$p_i = \frac{1}{Ns} P,$$

for any i. When with deficient rank ($N_r < N_s$), $p_i$=0 when $x_i$=0.

More advanced power-loading may be utilized to boost the system throughput and improve the performance of the edge user.

For illustration, the following examples are given:

EXAMPLE 1

2×2 rank 2 equal power:

$$\begin{pmatrix} a_1 \\ a_2 \end{pmatrix} = V_{k,t} \times S^* = 0.5 * (Pv_0 \quad Pv_1) \begin{pmatrix} S_1 \\ S_2 \end{pmatrix},$$

with $v_i$ as the 2×1 vector.

EXAMPLE 2

2×2 rank 1 with power-loading:

The vector, V, is a 2×2 matrix. If $N_r$=1, the configuration is a rank 1 MIMO. The transmission equation is:

$$\begin{pmatrix} a_1 \\ a_2 \end{pmatrix} = V_{k,t} \times S^* = (Pv_0 \quad 0) \begin{pmatrix} s_1 \\ 0 \end{pmatrix},$$

for two transmit antennas.

EXAMPLE 3

2×2 rank 1 with equal power:

Another approach for the deficient rank is to duplicate the source signal to multiple spatial streams. In the receiver, a combining technique is used, in some embodiments, to enhance the signal quality.

For example, with rank 1 MIMO. The transmission equation may be:

$$\begin{pmatrix} a_1 \\ a_2 \end{pmatrix} = V_{k,t} \times S^* = (Pv_0 \; Pv_1)\begin{pmatrix} s_1 \\ s_1 \end{pmatrix},$$

for two transmit antennas.

EXAMPLE 4

4×2 rank 2:

$$\begin{pmatrix} a_1 \\ a_2 \\ a_3 \\ a_4 \end{pmatrix} = V_{k,t} \times S^* = 0.5 * (Pv_0 \; Pv_1)\begin{pmatrix} s_1 \\ s_1 \end{pmatrix},$$

where $v_i$ is the 4×1 vector.

EXAMPLE 5

4×2 rank 4:

$$\begin{pmatrix} a_1 \\ a_2 \\ a_3 \\ a_4 \end{pmatrix} = V_{k,t} \times S^* = 0.5 * (Pv_0 \; Pv_1 Pv_2 \; Pv_3)\begin{pmatrix} s_1 \\ s_2 \\ s_3 \\ s_4 \end{pmatrix},$$

where $v_i$ is the 4×1 vector.

In Example 5, where the allocated spatial stream number, $N_r$, is greater than the number of antennas in the receiver (b of a×b), using a linear detection algorithm (such as minimum mean square error, MMSE), the receiver may not detect all of the four spatial streams successfully. The subscriber station 102 should be able to detect two of the spatial streams, and treat the other two spatial streams as interference.

A simple solution is to fix the antenna group. For example, suppose spatial streams, $s_1$ and $s_2$, are in the same group (group 1) and spatial streams, $s_3$ and $s_4$, are in a second group (group 2). When the CQI is estimated and the signal detected, the two groups should be jointly processed. When the CQI of the spatial stream, $s_1$, is estimated, the subscriber stations 102 should jointly process the spatial streams of group 1, that is, both spatial stream, $s_1$, and spatial stream, $s_2$, and the spatial streams of group 2, $s_3$ and $s_4$, should be treated as interference.

V Matrix

The purpose of the V matrix is to introduce the fluctuation in the frequency, time, and spatial domains to obtain the "T-F-S" multi-user diversity, especially in the flat fading channel. In some embodiments, the selection of the V matrix 300 considers the effect of fluctuation and the peak-to-average power ratio (PAPR) issue. When calculating the channel quality, the V matrix 300 is multiplied by an estimated channel, H. In order to avoid the boost of noise from a channel estimation (CE), a unitary matrix may be used. In some special cases, a non-unitary matrix is a good choice.

In designing the V matrix 300, each antenna receives equal power, in some embodiments. If the power of each row of the V matrix 300 is the same, the power from each antenna will be the same.

In some embodiments, the V matrix 300 may be changed periodically. (A non-changing V matrix is a special case.) For the ease of CQI estimation, both the BS 106 and the SS 102 should know the V matrix 300 change pattern. In other words, the BS 106 and the SS 102 should be synchronized with respect to the V matrix 300.

For the synchronization, the V matrix 300 is generated by an equation and is known to both the BS 106 and the SS 102. A cell identifier (ID), a sector ID, a frame number, and a sub-channel number are used to determine the V matrix 300, in some embodiments.

Among unitary matrixes, a discrete Fourier transform (DFT) matrix has a constant amplitude, which will not introduce a peak-to-average power ratio (PARA) issue.

The DFT matrix equation is as follows:

$$v_m^{(g)} = \frac{1}{\sqrt{M}}\left[v_{0m}^{(g)} \ldots v_{(M-1)}^{(g)}\right]^T \qquad (5)$$

$$v_{mn}^{(g)} = \exp\left\{j\frac{2\pi n}{M}\left(m + \frac{g}{G}\right)\right\}$$

where G is the total number of V matrixes, g is the index of V from the G matrix, and m is the column index of V which corresponding to a spatial stream.

For example, for a configuration with two transmit antennas (M=2) and eight possible groups (G=8), the DFT matrix equation is:

$$V^0 = \frac{1}{\sqrt{2}}\begin{bmatrix} 1 & 1 \\ 1 & -1 \end{bmatrix}, V^1 = \frac{1}{\sqrt{2}}\begin{bmatrix} 1 & 1 \\ e^{j\frac{1}{8}\pi} & e^{j\frac{9}{8}\pi} \end{bmatrix}, \qquad (6)$$

$$V^2 = \frac{1}{\sqrt{2}}\begin{bmatrix} 1 & 1 \\ e^{j\frac{1}{4}\pi} & e^{j\frac{5}{4}\pi} \end{bmatrix}, V^3 = \frac{1}{\sqrt{2}}\begin{bmatrix} 1 & 1 \\ e^{j\frac{3}{8}\pi} & e^{j\frac{11}{8}\pi} \end{bmatrix},$$

$$V^4 = \frac{1}{\sqrt{2}}\begin{bmatrix} 1 & 1 \\ e^{j\frac{1}{2}\pi} & e^{j\frac{3}{2}\pi} \end{bmatrix}, V^5 = \frac{1}{\sqrt{2}}\begin{bmatrix} 1 & 1 \\ e^{j\frac{5}{8}\pi} & e^{j\frac{13}{8}\pi} \end{bmatrix}, \qquad (7)$$

$$V^6 = \frac{1}{\sqrt{2}}\begin{bmatrix} 1 & 1 \\ e^{j\frac{3}{4}\pi} & e^{j\frac{7}{4}\pi} \end{bmatrix}, V^7 = \frac{1}{\sqrt{2}}\begin{bmatrix} 1 & 1 \\ e^{j\frac{7}{8}\pi} & e^{j\frac{15}{8}\pi} \end{bmatrix},$$

The equation of the V generator 430 should select an index (g) of the V matrix 300 for each sub-channel from the pool within which there are G candidate V matrixes.

The V matrix 300 is an $N_m \times N_s$ matrix, with $N_m$ being the number of transmit antennas and $N_s$ being the number of supported streams. When the number of supported streams, $N_s$, is smaller than the number of transmit antennas, $N_m$, such as with a 4×2 configuration supporting two streams, an $N_m \times N_m$ V matrix is generated first (considering only the number of transmit antennas). Subsequently, an $N_s$ column may be used to construct the $N_m \times N_s$ V matrix.

Figure 5:
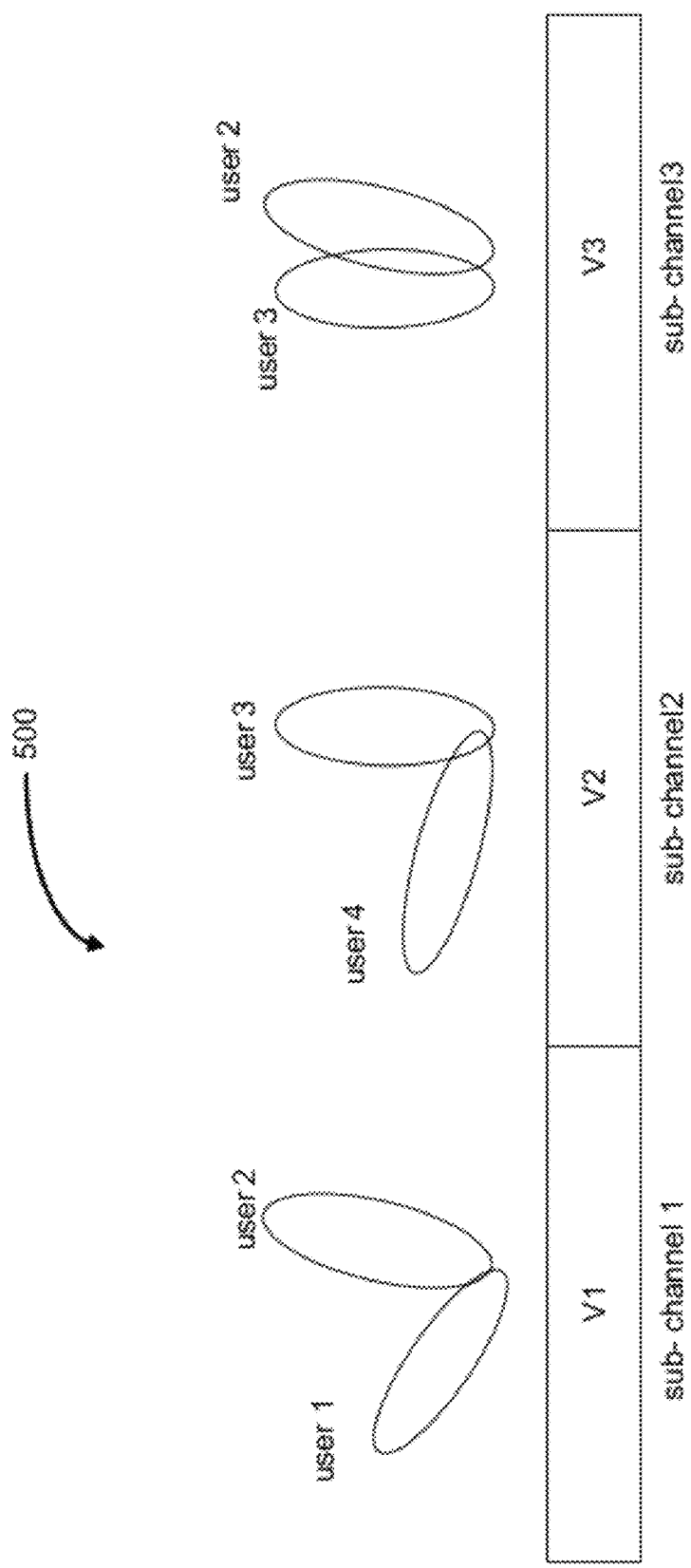
FIG. 5 is an illustration of a V vector used in different sub-channels.

An illustration 500 of a V vector used in different sub-channels is depicted in FIG. 5, according to some embodiments. In the illustration 500, matrixes V1, V2, and V3 are used in sub-channels 1, 2, and 3, respectively. Four users; user 1, user 2, user 3, and user 4, are shown. User 1 occupies sub-channel 1 only; user 2 occupies sub-channels 1 and 3; user 3 occupies sub-channels 2 and 3; and user 4 occupies sub-channel 2 only. The ovals representing spatial streams 212 for the users, with each spatial stream 212 corresponding to one column of the V matrix 300.

Other forms of the V matrix 300 may also be good candidates, such as configurations with four transmit antennas and two supported spatial streams 212. The following V matrix 300 will introduce the antenna switch and combination. By using this kind of V matrix 300, the MIMO is an "antenna switch and combination" implementation of MIMO.

$$V_1 = \begin{bmatrix} 1 & 0 \\ 0 & 1 \\ 0 & 1 \\ 0 & 1 \end{bmatrix}, V_2 = \begin{bmatrix} 0 & 1 \\ 1 & 0 \\ 0 & 1 \\ 0 & 1 \end{bmatrix}, V_3 = \begin{bmatrix} 0 & 1 \\ 0 & 1 \\ 1 & 0 \\ 0 & 1 \end{bmatrix},$$

$$V_4 = \begin{bmatrix} 0 & 1 \\ 0 & 1 \\ 0 & 1 \\ 1 & 0 \end{bmatrix}, V_5 = \begin{bmatrix} 1 & 0 \\ 1 & 0 \\ 0 & 1 \\ 0 & 1 \end{bmatrix}...$$

CQI Measure

At frame (sub-frame) n and sub-channel m, the SS 102 may estimate the channel state information (CSI) based on the pilot. The effective channel $\overline{H(n,m)}$=H(n, m)×V(n+D, m) may be estimated based on pilot tones. The integer, D, is applied to take the CQI feedback delay into consideration.

CQI calculation is based on the effective channel and noise power by minimum mean square error (MMSE), maximum likelihood detection (MLD), or other detection algorithms.

One of the different CQI types, horizontal spatial multiplexing, vertical spatial multiplexing, or HSM with serial interference cancellation, is obtained. In the stage of CQI measurement, the power is assumed to be equally allocated among the different spatial streams.

In some embodiments, channel prediction is utilized to counteract a delay and time domain down sample for CQI feedback. A "down sample" means feedback CQI every few time slots.

Several physical layer (phy) abstractions and link adaption algorithms may exist. In each, the definition of channel quality is different. For example, signal-to-interference-plus-noise ratio (SINR, in dB) may be used for an effective SINR method, and bits may be used for the mutual information method. Effective SINR and mutual information are two methods for indicating the channel quality. In some embodiments, the BS 106 and the SS 102 are synchronized in terms of the channel quality definition used by each.

The SS 102 estimates the CQI of $N_s$ supported streams. This estimate is then fed back to the BS 106, using a feedback overhead reduction algorithm, in some embodiments.

Space-time Block Code MU-MIMO

Instead of spatial multiplexing MU-MIMO, the USM method 230 may employ space-time block code (STBC) MU-MIMO, in some embodiments. In STBC, multiple copies of a data stream are transmitted using multiple antennas. At the receiver, some of the transmitted copies will be less corrupted than others. The receiver uses space-time coding to combine all copies of the received signal, hoping to obtain a copy representative of the intended transmission. An STBC may be represented using a matrix, in which each row represents a time slot and each column represents the transmission of one antenna over time.

In STBC MU-MIMO, one code-word is occupied by a single user. Multiple users may be allocated in one resource block, occupying different space-time code-words. The stacked Alamouti space-time code is an example of such MU-MIMO, and is described in the following paragraphs.

Transmitter

Figure 6:
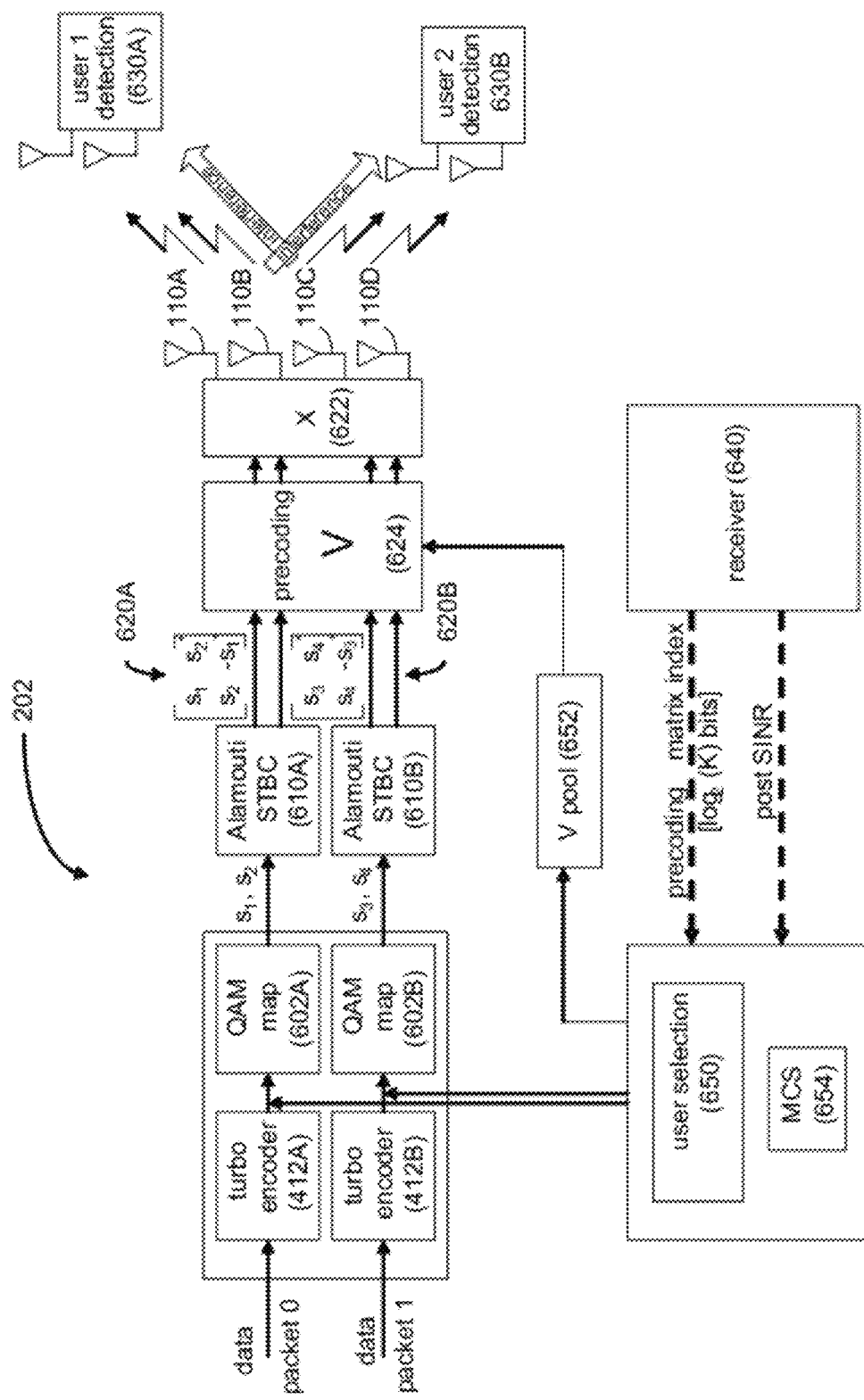
FIG. 6 is a diagram of a transmitter designed to perform space-time block coding multiple-user multiple-input-multiple-output.

FIG. 6 is a diagram of a transmitter 202 employing STBC MU-MIMO, according to some embodiments. In explaining operation of the transmitter 202, a 4×2 antenna configuration is used as an example.

There are two users to whom transmission is to be made simultaneously, user 1 and user 2 (at right side of the figure). The spatial streams, $s_1,s_2$ are intended for user 1, while the spatial streams, $s_3,s_4$ are intended for user 2.

In some embodiments, the BS 106 utilizes the 2×2 Alamouti space-time encoders, 610A and 610B, to obtain two Alamouti codes 620A and 620B, as in equation (3), above. The transmitting signal is X 622, which is obtained by the pre-coding matrix V 624.

$$X = V \begin{bmatrix} s_1 & s_2^* \\ s_2 & -s_1^* \\ s_3 & s_4^* \\ s_4 & -s_3^* \end{bmatrix} \text{ where, } X = \begin{bmatrix} x_{1,t} & x_{1,t+1} \\ x_{2,t} & x_{2,t+1} \\ x_{3,t} & x_{3,t+1} \\ x_{4,t} & x_{4,t+1} \end{bmatrix} \quad (8)$$

is the transmitting signal at time slots, t and t+1, and V=[$v_1$ $v_2$ $v_3$ $v_4$] is a 4×4 matrix, with its columns $v_1$, $v_2$, $v_3$, $v_4$ orthogonal each other. A 4×4 DFT matrix is a good candidate for the V matrix selection.

In the design of the USM method 230, the spatial streams are not as straightforward as with symmetric MU-MIMO. However, one Alamouti code 620 may be treated as one spatial stream 212, with each user occupying one spatial stream 212. $N_s$, the number of supported streams, is two in this example (thus, two Alamouti codes 620 exist).

In the deficient rank case (rank=1<$N_s$=2), the source data from one user may be duplicated in multiple spatial streams 212. For example, the transmit data, X, becomes:

$$X = V \begin{bmatrix} s_1 & s_2^* \\ s_2 & -s_1^* \\ s_3 & s_4^* \\ s_4 & -s_3^* \end{bmatrix} \quad (9)$$

$$X = V \begin{bmatrix} s_1 & s_2^* \\ s_2 & -s_1^* \\ s_1 & s_2^* \\ s_2 & -s_1^* \end{bmatrix}$$

Receiver

For the $i^{th}$ user, with downlink channel, $H_t^i$, at time slot, t, the $i^{th}$ user's received data is represented mathematically as follows:

$$\begin{bmatrix} r_{t,1} & r_{t+1,1} \\ r_{t,2} & r_{t+1,2} \end{bmatrix} = \quad (10)$$

$$H_t^i \cdot [v_1 \ v_2] \cdot \begin{bmatrix} s_1 & s_2^* \\ s_2 & -s_1^* \end{bmatrix} + \underbrace{H_t^i \cdot [v_3 \ v_4] \cdot \begin{bmatrix} s_3 & s_4^* \\ s_4 & -s_3^* \end{bmatrix}}_{Interference} + n$$

where, $$H_t^i = \begin{bmatrix} h_{1,1} & h_{1,2} & h_{1,3} & h_{1,4} \\ h_{2,1} & h_{2,2} & h_{2,3} & h_{2,4} \end{bmatrix}$$

is the user's downlink channel at time slot, t.

Minimum mean-square error (MMSE) detection is used to separate the signal and interference items, in some embodiments. The equivalent channel that was derived from the weighted channel, $H_t^i \cdot [v_1 \ v_2], H_t^i \cdot [v_3 \ v_4]$ and its Alamouti STBC equivalent channel, $\overline{H}_{t,e}^i$, is given by the following equations, 11 and 12.

Equivalent channel:

$$\overline{H}_t^i = \begin{bmatrix} h_{1,1} & h_{1,2} & h_{1,3} & h_{1,4} \\ h_{2,1} & h_{2,2} & h_{2,3} & h_{2,4} \end{bmatrix} \cdot V = \begin{bmatrix} \overline{h}_{1,1} & \overline{h}_{1,2} & \overline{h}_{1,3} & \overline{h}_{1,4} \\ \overline{h}_{2,1} & \overline{h}_{2,2} & \overline{h}_{2,3} & \overline{h}_{2,4} \end{bmatrix} \quad (11)$$

Alamouti equivalent channel:

$$\overline{H}_{t,e}^i = \begin{bmatrix} \overline{h}_{1,1} & \overline{h}_{1,2} & \overline{h}_{3,1} & \overline{h}_{3,2} \\ \overline{h}_{2,1} & \overline{h}_{2,2} & \overline{h}_{4,1} & \overline{h}_{4,2} \\ -\overline{h}_{1,2}^* & -\overline{h}_{1,1}^* & -\overline{h}_{3,2}^* & -\overline{h}_{3,1}^* \\ -\overline{h}_{2,2}^* & -\overline{h}_{2,1}^* & -\overline{h}_{4,2}^* & -\overline{h}_{4,1}^* \end{bmatrix} \quad (12)$$

So, equation 10 may be equivalent to equation 13. Equation 13, below, is based on equations 11 and 12.

$$\begin{bmatrix} r_{t,1} \\ r_{t,2} \\ r_{t+1,1}^* \\ r_{t+1,2}^* \end{bmatrix} = \begin{bmatrix} \overline{h}_{1,1} & \overline{h}_{1,2} & \overline{h}_{3,1} & \overline{h}_{3,2} \\ \overline{h}_{2,1} & \overline{h}_{2,2} & \overline{h}_{4,1} & \overline{h}_{4,2} \\ -\overline{h}_{1,2}^* & -\overline{h}_{1,1}^* & -\overline{h}_{3,2}^* & -\overline{h}_{3,1}^* \\ -\overline{h}_{2,2}^* & -\overline{h}_{2,1}^* & -\overline{h}_{4,2}^* & -\overline{h}_{4,1}^* \end{bmatrix} \cdot \begin{bmatrix} s_1 \\ s_2 \\ s_3 \\ s_4 \end{bmatrix} + n \quad (13)$$

Here, $r_{t,1} \ r_{t,2} \ r_{t+1,1} \ r_t+1,2$ represent the received data at time slots, t and t+1, of two receiver antennas. Based on equation 13, the subscriber station 102 may detect the receiver data based on MMSE detection.

CQI Measurement

With $\overline{H}_t^i$, the user i can calculate four post-SINRs, based on MMSE with its Alamouti equivalent channel $\overline{H}_{t,e}^i$, the former two belonging to the two CQIs of the first stream, and the later two belonging to the two CQIs of the second streams.

Based on an Alamouti equivalent channel (from channel estimation), the SS 102 may obtain the CQI of the two streams by averaging the first two SINRs and the later two SINRS, respectively.

The SS 102 feeds the CQI of the two streams back for the BS 106 scheduling and MCS selection. With BS 106 scheduling, the two spatial streams 212 may be allocated to one user or to two users. Every user will detect the two spatial streams 212, but in the case where two users have been selected, every user will abandon the data of the other spatial stream 212. Where only one use has been selected, the BS 106 will allocate the two spatial streams 212 to the selected user, and the user validates the data of the two spatial streams 212 after detection.

Hybrid MU-MIMO

The SM and STBC user may be allocated to a single resource block. For example, with a 4×2 configuration, with a rank of 3, two users are allocated together, one is a STBC user (rate 1), and the other is a SM user (rate 1).

$$\begin{pmatrix} a_1 \\ a_2 \\ a_3 \\ a_4 \end{pmatrix} = V_{k,t} \times S^* = 0.5 * (V) \begin{pmatrix} s_1 & s_2^* \\ s_2 & -s_1^* \\ s_3 & s_5 \\ s_4 & s_6 \end{pmatrix},$$

where $s_1$ and $s_2$ are from user 1 (the STBC user), and $s_3$, $s_4$, $s_5$, and $s_6$ from user 2 (the SM user).

Unified Scheduler

After the SSs 102 feed back the CQI at each sub-channel and for each spatial stream 212 (full CQI feedback case), the BS 106 can schedule users to resource blocks 220 and apply mode and rank adaptation dynamically, based on a specific strategy, such as maximum carrier to interference ratio (max C/I), proportional fairness (PF), and so on. (Maximum carrier to interference ratio and proportional fairness are types of scheduling algorithms.) The inter-user power-loading is also applied, in some embodiments.

The USM method 230 defines the CQI of user k at sub-channel i and stream j as CQI(k, i, j). K is the total number of active SSs 102, and $N_b$ is the number of available sub-channels. Using these definitions, the allocated user index, k*, for each resource block, with max C/I scheduler is given by the following pseudo-code:

```
For i = 1:N_b
    For j = 1:N_s
        k* = max CQI(k, i, j)
              k=1:K
    End
End
```

If a fairness scheduling algorithm is used instead of the max C/I scheduler, the above pseudo-code may be replaced by:

```
For i = 1:N_b
    For j = 1:N_s
        k* = max F(CQI(k, i, j), R_k)
              k=1:K
    End
End
``` where function, F( ), is a fairness metric, such as proportional fairness, and $R_k$ is a history data rate.

With proportional fairness, the F( ) function is given by the following equation:

$$F(CQI(k, i, j), R_k) = \frac{CQI(k, i, j)}{R_k}.$$

With this kind of scheduling algorithm, one sub-channel may hold one or multiple users implicitly. The USM method 230 is a unified approach for SU and MU-MIMO. With fairness scheduling, the equation may be modified accordingly.

An example of SU-MIMO and MU-MIMO are shown in FIG. 7 and FIG. 8, respectively, according to some embodiments. The CQI reported by each user (SS 102) to the BS 106 is given in each table, in dB. In FIG. 7, the user 2 reports the highest CQI, 20 dB for spatial stream 1 and 15 dB for spatial stream 2, as compared to reports from the other users to the BS 106. Thus, both spatial stream 1 and spatial stream 2 are allocated to the user 2 by the BS 106. In FIG. 8, user 5 reports the highest CQI for spatial stream 1 (4 dB) while user 1 reports the highest CQI for spatial stream 2 (3 dB). Thus, spatial stream 1 is allocated to user 5 while spatial stream 2 is allocated to user 1. By this kind of multiple-user scheduling, the sum capacity is increased, in some embodiments.

Stream (Rank) Adaptation in MU-MIMO

For some cases, the CQI of a scheduled user may not satisfy the packet error rate (PER) target. In such a circumstance, in some embodiments, rank adaptation to a low rank is applied.

In the USM method 230, spatial stream 212 adaptation is used, in some embodiments. The maximum spatial stream 212 number is $N_s$, while $N_m$ is the total number of transmit antennas. Generally, $N_s \leq N_m$. And, the more spatial streams 212 supported, the more system throughput.

However, some limitations may exist, which limit $N_s$ to be a smaller number. The limitations include the number of receiver antennas, bad channel conditions, and high correlation between antennas. In the first case, if the number of receiver antennas is less than the number of supported streams ($N_n < N_s$), it is possible that the BS 106 may not select the $N_s$ users that the interference from "$N_s$ minus $N_n$" streams is small enough to obtain better sum capacity. In this case, the BS 106 uses a smaller number of spatial streams ($N_s$) to maximize the capacity while maintaining user throughput, in some embodiments.

Where a bad channel condition or high correlation between a base station antenna 110 and subscriber station antenna 210 exists, the channel quality of some cell edge users may be quite bad. In some embodiments, the USM method 230 uses a low number of streams to increase the signal quality. One extreme case is where there is only one available spatial stream, $N_s=1$, and all of the antennas transmit across this same spatial stream 212 for the dedicated user. The antenna correlation also will limit the supported spatial stream 212 number for a specific user.

The spatial stream 212 adaptation is highly correlated to the MIMO mode adaptation, SU/MU adaptation. In the USM method 230, a spatial stream 212 adaptation mode is used for two-transmitter and four-transmitter MIMO cases.

For the two-transmitter case, with a single spatial stream, $N_s=1$, the USM method 230 uses a 2×2 Alamouti code (rate 1). Where there are two spatial streams, $N_s=2$, the USM method 230 uses 2×2 spatial multiplex MU-MIMO (rate 2).

For the four-transmitter case, with a single spatial stream, $N_s=1$, the USM method 230 uses four-transmitter STBC (rate 1). Where there are two spatial streams, $N_s=2$, the USM method 230 uses a stacked Alamouti code (rate 2). Where there are three spatial streams, $N_s=3$, the USM method 230 uses a hybrid mode, with one Alamouti code, together with a two-transmitter spatial multiplex mode. Where there are four spatial streams, $N_s=4$, the USM method 230 employs spatial multiplexing (rate 4).

In some embodiments, the USM method 230 uses one of two kinds of adaptation: semi-static adaptation and subscriber station-controlled adaptation. Each of these is discussed in turn.

With semi-static adaptation, the BS 106 and the SS 102 decide the spatial stream 212 number (mode) that will be valid for a relatively long time. The SS 102 informs the BS 106 when a mode change is desired, in some embodiments. With semi-static adaptation, the SS 102 may only be in one mode at a time. For example, in the 2×2 configuration, the SS 102 may be in a single-stream case ($N_s=1$) when its channel condition is bad, and may switch to a dual-stream mode ($N_s=2$) when the channel becomes good. The switch between single-stream and dual-stream occurs by signaling between the SS 102 and the BS 106. The SS 102 only needs to estimate the CQI of the current stream (mode), and feed back the CQI of such mode to the BS 106.

With subscriber station-controlled adaptation, the SS 102 feeds back the CQI of all the possible spatial streams case (mode). For a 2×2 configuration, the are two modes: single-stream and dual-stream modes. The SS 102 estimates the CQI in both single-stream mode and dual-stream mode, and either feeds back all of the CQI, both single- and dual-stream CQI, or feeds back the preferred one with an indication of the CQI preference, to the BS 106.

In some embodiments, when it schedules a user, the BS 106 takes the spatial stream number into consideration, and decides the spatial stream number and schedules the user under some criteria. The criteria may be, for example, to maximize the system capacity or to guarantee the fairness of a badly conditioned user, that is, a user with a bad channel condition, such as low SINR.

For example, supposed there is a 4×2 or a 2×2 configuration, with a maximum of two streams. The scheduling algorithm with stream adaptation is given by the following pseudo-code:

```
For i = 1:N_b
    For m = 1:N_s_Max
        For j = 1:N_s
            k*(i, j) = max F(CQI(k, i, j), R_k)
                     k=1:K
        End
        ModeMetric(m, i) = sum(F(CQI(k* (i, j), i, j, R_k))
    End
    Mode(i) =    max       ModeMetric(m, i)
             m=1:Ns_Max
End
``` where $N_s\_Max$ is the maximum number of spatial streams supported in the system, and Mode(i) is the selected stream number for band, i, and $N_b$ is the number of resource blocks.

In order to reduce the CQI feedback overhead, the SS 102 may only feed back the CQI of its preferred mode. When deciding the mode by the equation, the missing CQI is set to zero or a negative value, in some embodiments.

Two kinds of resource allocation methods for spatial stream adaptation are proposed: a fixed method and a flexible method. Both of these methods are described in turn.

In the communication system, certain resource blocks 220 are allocated to certain spatial stream modes. The resource blocks 220 need the BS 106 to broadcast control information whenever the resource allocation needs to be changed. For example, in the system, one third of the resource blocks 220 may be allocated to a single-stream mode, and serve the bad channel user. The other resource blocks 220 are allocated to the dual-stream mode.

Under the fixed method, associated with the SS 102 semi-static adaptation, the SS 102 estimates the CQI of a certain resource block 220, and feeds the CQI to the BS 106. Using the fixed method, the feedback overhead may be reduced, because the number of interested resource blocks 220 is limited to certain ones. The drawback of the fixed method is that it is difficult for the BS 106 to obtain optimal resource allocation that is suitable for the current user and channel.

By contrast, with the flexible method, the mode of any resource block 220 may be flexible, and is decided by the fed back CQI and the scheduling algorithm. The SS 102 feeds the CQI of the resource blocks 220 (either the CQI of all modes or only of the preferred mode with indication) back to the BS 106. The BS 106 schedules user and spatial streams 212 with the unified scheduling algorithm mentioned above. After scheduling, the mode of certain resource blocks 220 may be decided.

In some embodiments, the flexible method has better performance than the fixed method, because the flexible method fully utilizes the diversity of both the channel and the user. However, the CQI feedback overhead is expected to be somewhat larger than with the fixed method.

Figure 9:
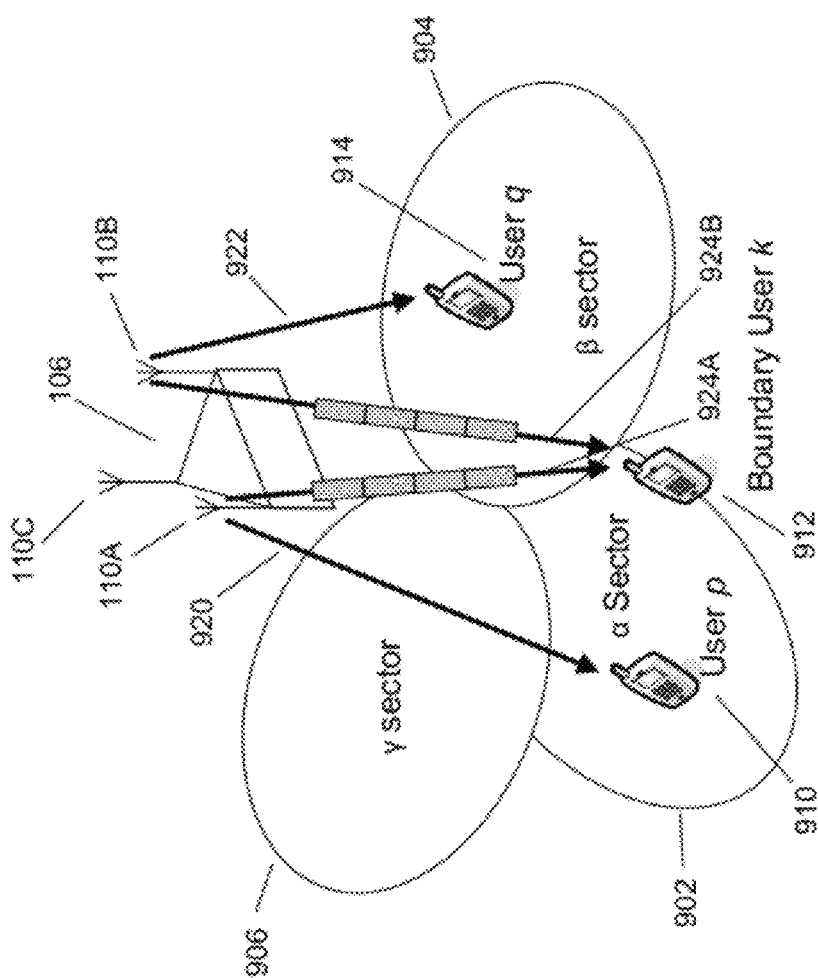
FIG. 9 is an illustration of a base transceiver station in communication with a boundary user subscriber station and two other subscriber stations in adjacent sectors.

A base transceiver station 106 in communication with a Boundary User k 912, User p 910 in α sector 902, and User q 914 in β sector 904 in adjacent sectors is illustrated in FIG. 9. In this embodiment, the base transceiver station 106 communicates in downlink with boundary user k 912 through spatial streams 924A and 924B, User p 910 through spatial stream P 920, and User q 914 through spatial stream Q 924. Here, the boundary user k 912 receives downlink communication from a base station antenna 110A used to communicate with α sector 902, and from a base station antenna 110B used to communicate with β sector 904 using sector micro diversity (SMD), wherein all involved sectors form a cell common to a single base transceiver station 106. Combining spatial streams 924A and 924B using SMD may provide the boundary user k 912 with improved communications throughput that would otherwise suffer from interference and/or interference as compared to other users such as User p 910 in α sector 902 or User q 914 in β sector 904. In an alternate embodiment, the boundary user k 912 communicates with a base station antenna 110A through α sector 902 and from a base station antenna 110C through γ sector 906.

Figure 10:
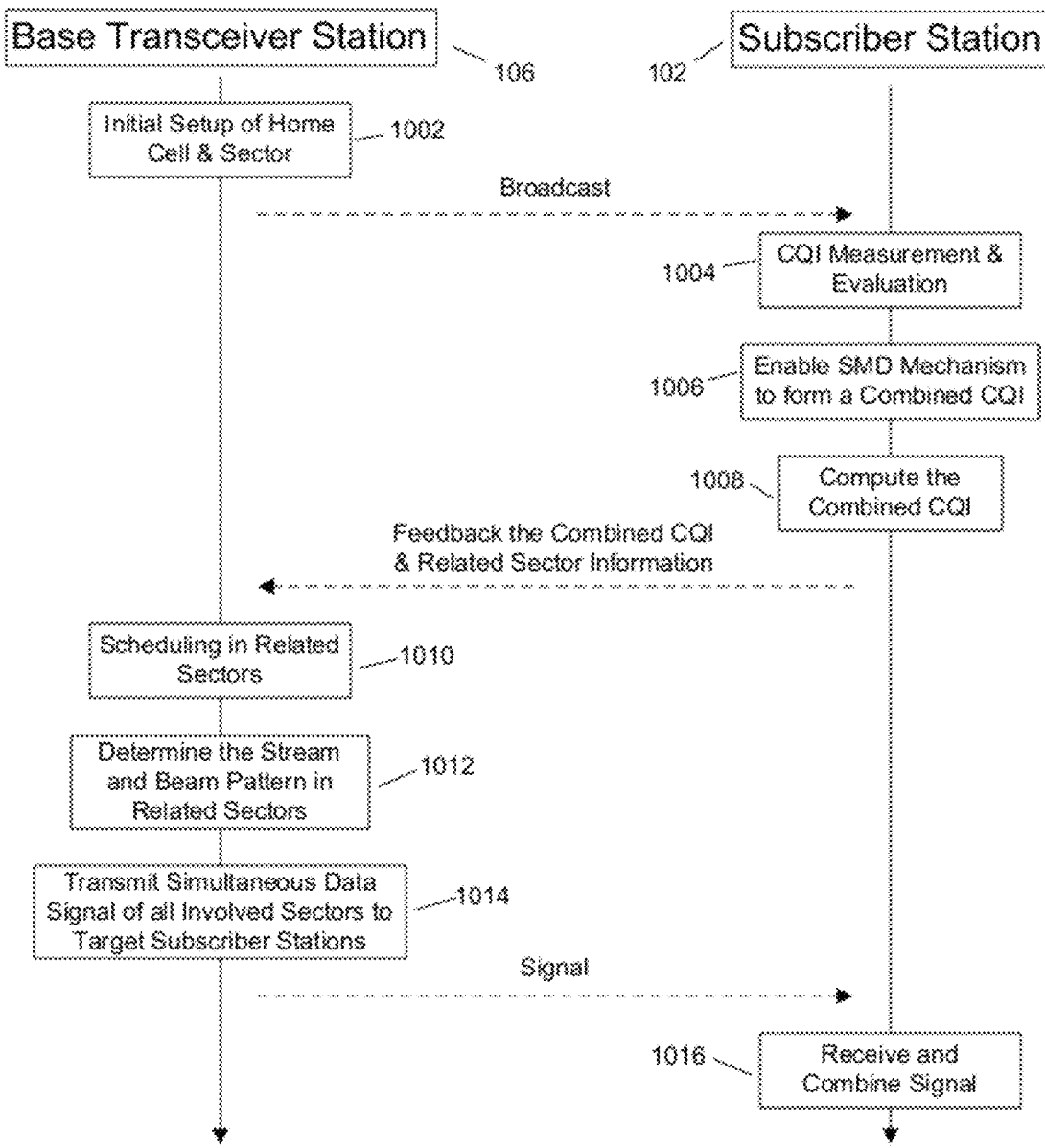
FIG. 10 is a flow diagram illustrating one embodiment of a subscriber station implementing a sector micro diversity mechanism (SMD) to form a combined channel quality indicator for receiving a plurality of resource blocks from a plurality of sectors of a base transceiver station.

FIG. 10 is a flow diagram illustrating one embodiment of a subscriber station 102 implementing a sector micro diversity mechanism (SMD) to form a combined channel quality indicator (CQI) for receiving a plurality of resource blocks 220 from a plurality of sectors of a base transceiver station 106. In element 1002, the boundary user k 912 performs an initial setup and identifies a home sector. In this embodiment, the home sector selected is the α sector 902 of FIG. 9. In element 1004, the user k 912 measures channel quality indicators, such as high interference and low received signal level, from the α sector 902, β sector 904, and the γ sector 906 from the same base transceiver station 106 at approximately the same time. Since user k 912 is located near or at a boundary of the α sector 902, the combined CQI of the home sector may be below a predetermined threshold. The combined CQI of the home sector is evaluated against the predetermined threshold, a received signal strength, or other criteria to determine whether to implement the use of SMD. The received signal strength can be measured by subscriber station 102 when the subscriber station 102 identifies a home sector. For example, a subscriber station 102 in a cell, after estimating three received signal strengths from three sectors respectively and choosing the sector with maximal strength as the home sector, can also trigger SMD based on a predetermined threshold.

Based on this evaluation, a SMD mechanism is enabled to form a combined channel quality indicator, as shown in element 1006. The SMD mechanism allows resource blocks 220 from other sectors, such as β sector 904 to transmit and receive data signals from user k 912 at the same time that user k 912 transmits and receives data signals from α sector 902. In this embodiment, the SMD mechanism involves two sectors that employs the same level of modulation and coding schemes (MCS), but the embodiment is not so limited. The SMD mechanism may involve three or more sectors in an alternate embodiment. The user k 912 may compute the combined CQI according to an interference and received signal level of the two sectors and then feed the combined CQI, along with related sector information, back to the base transceiver station 106. In element 1008, a combined CQI is determined based on the plurality of spatial streams used to communicate with the user k 912. The combined CQI with a higher MCS is better than a CQI of the home sector, α sector 902. According to the combined CQI, the base transceiver station 106 selects the higher MCS for the user k 912 and schedules resource blocks in α sector 902 and β sector 904, as shown in element 1010. The base transceiver station 106 controls the α sector 902 and the β sector 904 to determine a spatial stream and beam pattern in element 1012. Data signals are transmitted simultaneously in resource blocks, as described in FIG. 11, to spatial stream 924A and 924B of FIG. 9 to the user k 912 in element 1014. The user k 912 receives and combines the data signals from the resource blocks in element 1016.

Figure 11:
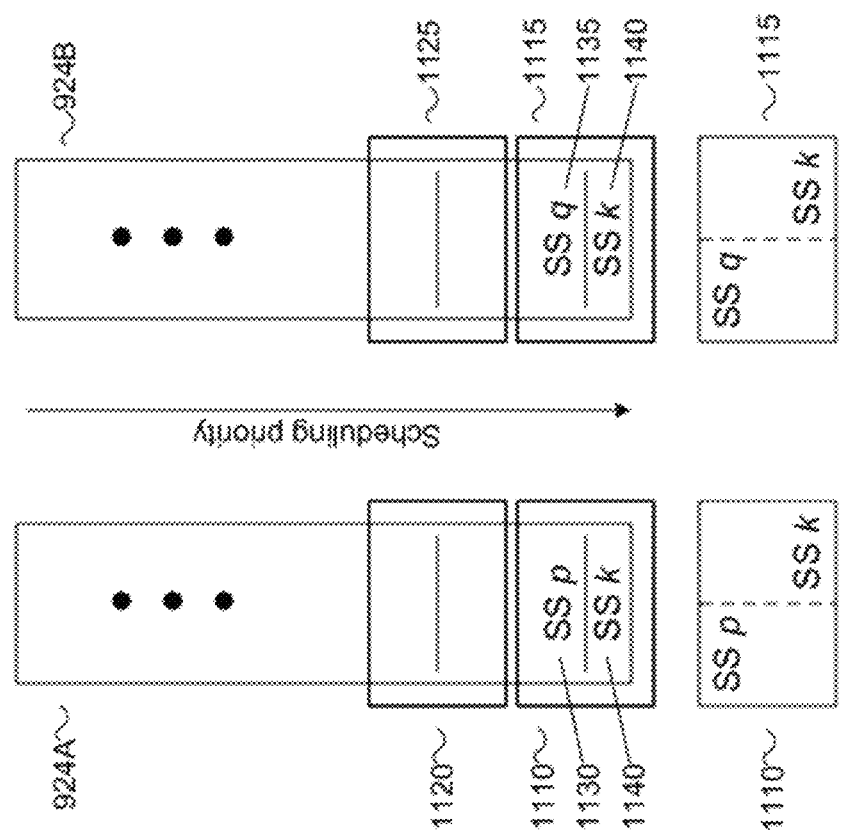
FIG. 11 is an illustration of a scheduling priority of data signals using SMD in a MU-MIMO environment.

The combination of data signals is illustrated in FIG. 11 wherein the data signals are prioritized and scheduled using SMD in a MU-MIMO environment. In this embodiment, the spatial stream 924A of the α sector 902 and spatial stream 924B of the β sector 904 are transmitted to the boundary user k 912 (see FIG. 9). The base transceiver station 106 is configured to transmit, according to a scheduler, a first m resource block 1110 to the boundary user k 912 as the same time that the boundary user k 912 receives a first n resource block 1115 so that the boundary user k 912 can receive two copies of a data signal from two downlink channels, or spatial streams, conveying the same traffic data. In alternate embodiment, the boundary user k 912 receives another copy of the data signal from a third downlink channel, or spatial stream. Using SMD, all data packets in the first m resource block 1110 and the first n resource block 1115 are transmitted by the base station 106 simultaneously to the user k 912 where the data packets can be combined, thereby improving throughput to the user k 912. The first m resource block 1110 in spatial stream 924A comprises p data packets 1130 for user p 910 in addition to k data packets 1140 for user k 912 in α sector 902. The first n resource block 1115 in spatial stream 924B comprises q data packets 1135 for user q 914 in β sector 904 in addition to the k data packets 1140 user k 912 in α sector 902.

For the user k 912 using SMD, although the data packets are transmitted simultaneously via different downlink channels in different sectors, the downlink channels do not interfere with each other because the data packets on these channels are the same. Other data packets are transmitted in second m resource block 1120 and second n resource block 1125 according to the scheduler.

Data packets may alternately be scheduled through a joint scheduling scheme (JSS). In one embodiment, according to ranging and random access results, user k 912 is connected to a home cell and home sector, such as α sector 902. JSS may require every scheduler of each sector in the same cell to collect and update all users' CQI information synchronously. Alternately, one uniform scheduler is used to schedule multiple sectors in a cell comprising α sector 902, β sector 904, and γ sector 906.

As an example, a transmitted queue of α sector 902, user p 910 is a user k 912 multi-user partner with one resource block in β sector 902 allocated to the user p 910 and user k 912. When the user k 912 is scheduled by the base transceiver station 106, the measured CQI of user k 912 from β sector 904 is the best of all sectors. The user k 912 will feedback its preferred sector, β sector 904, which is different from its home sector, α sector 902. Based on the better CQI feedback of user k 912, the base transceiver station 106 is also able to select a higher level mode of modulation and coding scheme for the user k 912, and dynamically decide the user q 914 as an updated MU partner of the user k 912. A home sector of the user q 914 may be β sector 904 or anyone of the 3 sectors of FIG. 9, the β sector 904 becomes the switched sector to transmit the data signal of the user k 912. Due to the optimal feedback CQI, the throughput of the user k 912 will be improved over none-JSS case. Using JSS, sector boundaries become dashed lines because a user's home sector may be freely assigned, independent of a user's location in a cell.

Figure 12:
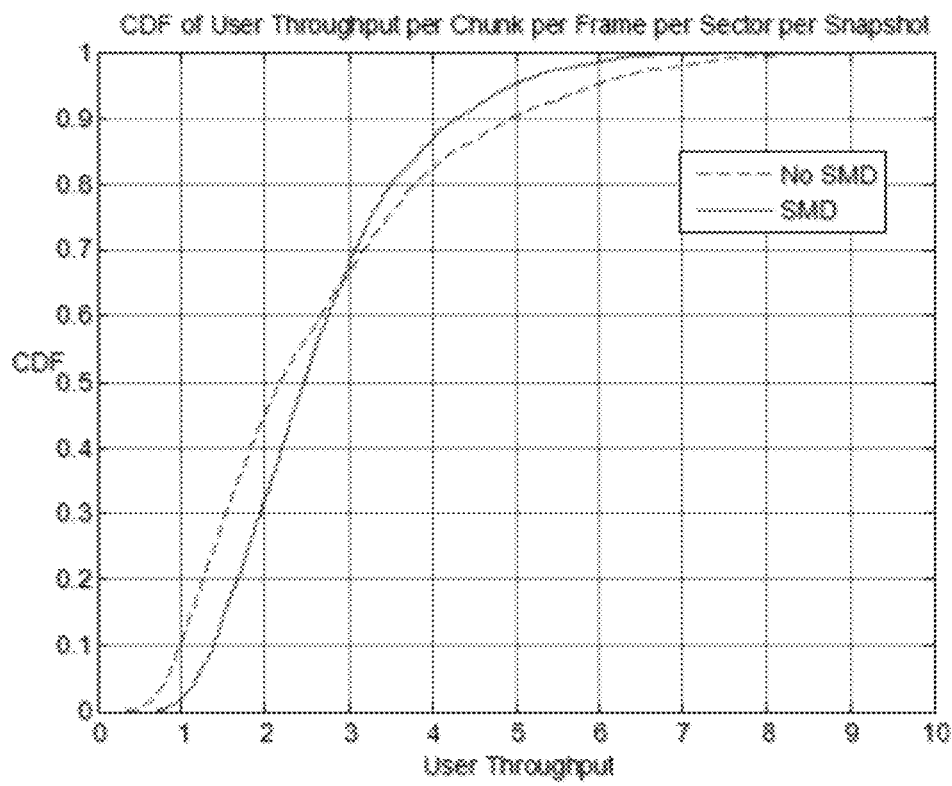
FIG. 12 is a cumulative distribution function plot illustrating communications data throughput for an average multi-user multi-input multi-output (MU MIMO) user with and without the use of a sector micro diversity mechanism.

FIG. 12 is a cumulative distribution function plot illustrating communications data throughput for an average multi-user multi-input multi-output (MU MIMO) user with and without the use of a sector micro diversity (SMD) mechanism. As shown in the plot of FIG. 12, system performance with SMD is enhanced as compared to the system performance without SMD for users with lower throughput, which shows that boundary users benefit from SMD.

Figure 13:
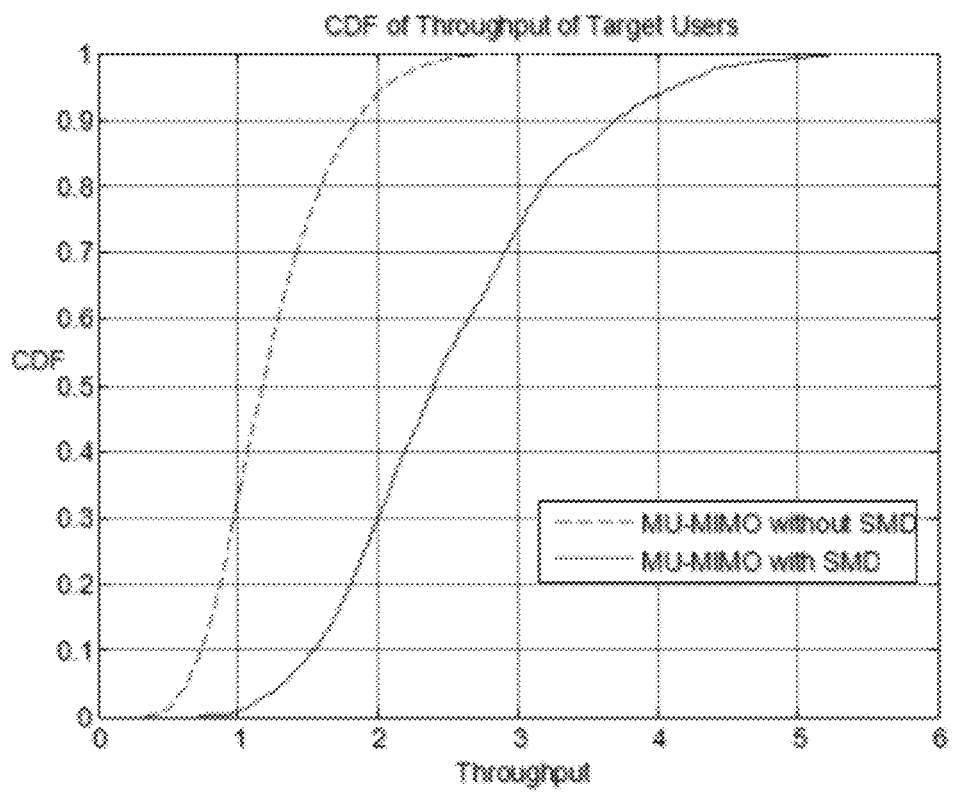
FIG. 13 is a cumulative distribution function plot illustrating communications data throughput for MU-MIMO users located in a boundary of sectors with and without the use of a sector micro diversity (SMD) mechanism

FIG. 13 is a cumulative distribution function plot illustrating communications data throughput for MU-MIMO users located in a boundary of sectors with and without the use of a sector micro diversity (SMD) mechanism. FIG. 13 clearly indicates that user throughput performance using SMD is better than without SMD at all throughput percentiles for boundary type users. There is a significant improvement in throughput performance for boundary users at a very small overhead cost.

Figure 14:
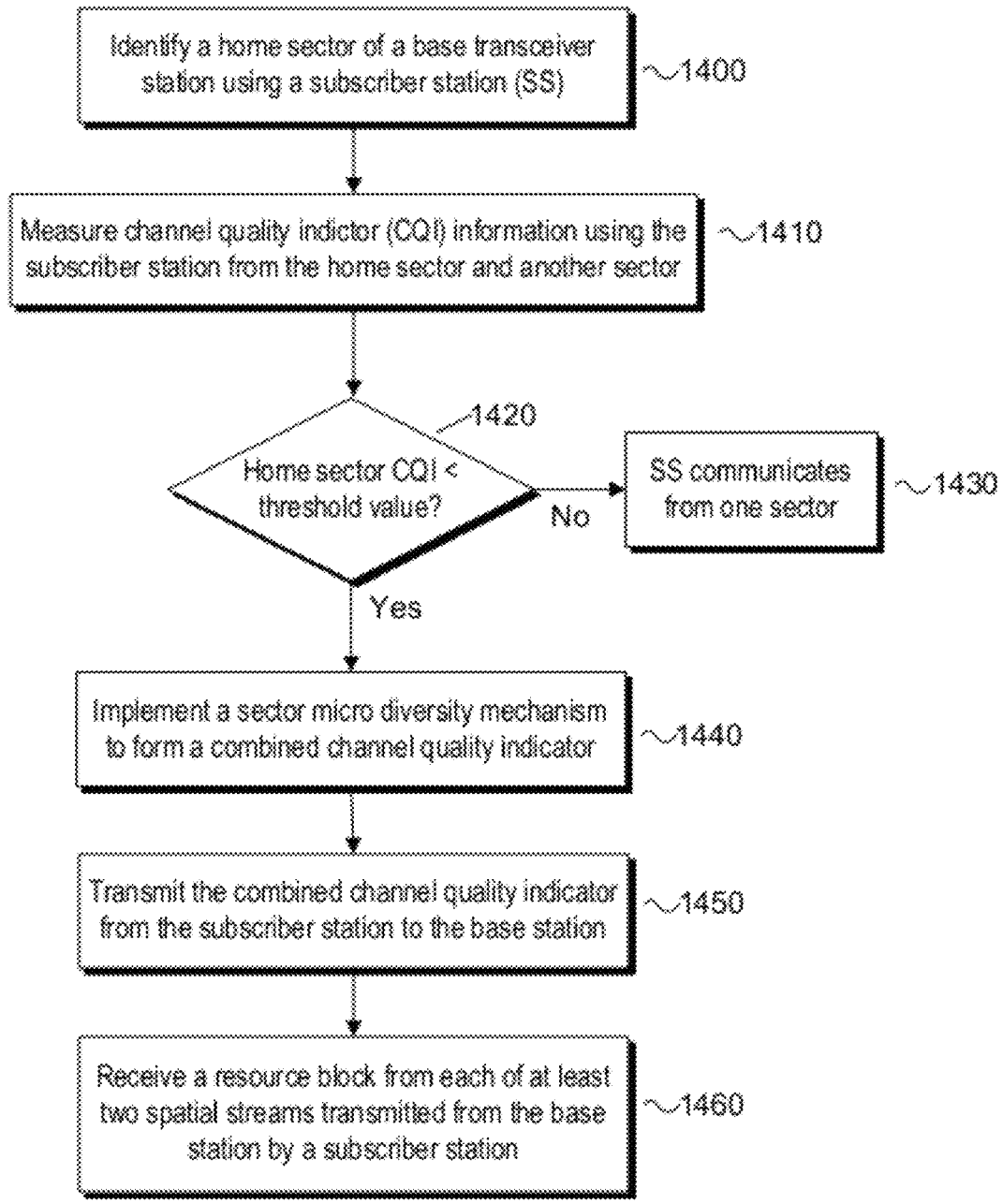
FIG. 14 is a flowchart of a method using SMD in a MU-MIMO environment.

FIG. 14 is a flowchart of a method using SMD in a MU-MIMO environment. In element 1400, a home sector of a base transceiver station 106 is identified using a subscriber station 102. Channel quality indicator information is measured in element 1410 using the subscriber station 102 from the home sector in addition to one or more other sectors. The home sector channel quality indicator information is compared against predetermined threshold value information in element 1420 and if the channel quality indicator information is greater than the threshold value information, the subscriber station 102 communicates from one sector. Otherwise, a sector micro diversity mechanism (SMD) is implemented in element 1440 to form a combined channel quality indicator. The combined channel quality indicator is transmitted from the subscriber station 102 to the base station 106 in element 1450. A resource block 220 is received by the subscriber station 102 from each of at least two spatial streams transmitted from the base station 106 in element 1460.

Embodiments of this invention may be used as or to support a software program executed upon some form of processing core (such as a processor of a computer) or otherwise implemented or realized upon or within a machine-readable medium. A machine-readable medium includes any mechanism for storing information in a form readable by a machine (e.g., a computer). For example, a machine-readable medium can include such as a read only memory (ROM); a random access memory (RAM); a magnetic disk storage media; an optical storage media; and a flash memory device, etc.

Modifications may be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A base station comprising:
 a plurality of antennas configured to facilitate wireless communication within a plurality of sectors serviced by the base station;
 a receiver configured to receive, through a feedback channel, a combined channel quality indicator, from a subscriber station having a first sector of the plurality of sectors as a home sector, the combined channel quality indicator being based on channel quality indicators of the first sector and a second sector that is adjacent to the first sector;
 a transmitter including a scheduler to schedule a first data packet to be transmitted to the subscriber station in a resource block of the first sector and a second data packet to be simultaneously transmitted to the subscriber station in a resource block of the second sector, wherein the second data packet is a copy of the first data packet, the first data packet and the second data packet include a common scheduling priority, and the first and second resource blocks are modulated based on the combined channel quality indicator.

2. The system of claim 1, wherein the scheduler schedules the first and second data packets in respective first and second spatial streams, the first and second spatial streams transmitted from respective first and second antennas of the plurality of antennas, with the first antenna serving the first sector and the second antenna serving the second sector.

3. The system of claim 2, wherein the scheduler schedules the data packets using proportional fairness principles.

4. The system of claim 1, wherein the receiver is configured to receive a signal from the subscriber station to indicate that the first sector is the home sector of the subscriber station.

5. The system of claim 4, wherein the receiver is configured to receive a signal from the subscriber station to indicate a preferred sector.

6. The base station of claim 1, wherein the second resource block includes a data packet directed to another subscriber station, wherein the other subscriber station has the second sector as a home sector.

7. The base station of claim 1, wherein the first and second resource blocks are transmitted with a modulation and coding scheme based on the combined channel quality indicator.

8. A method comprising:
 receiving, from a subscriber station having, as a home sector, a first sector of a plurality of sectors serviced by a base station, a combined channel quality indicator that is based on a channel quality indicator of the first sector and a channel quality indicator of the second sector;
 transmitting, by a first antenna of the base station that services the first sector, a data packet in a first resource block of a first spatial stream to the subscriber station; and
 transmitting, by a second antenna of the base station that services the second sector, a copy of the data packet in a second resource block of a second spatial stream to the subscriber station.

9. The method of claim 8, wherein transmitting the data packet and the copy of the data packet occur simultaneously.

10. The method of claim 8, further comprising:
 transmitting, by the second antenna, another data packet in the second resource block, the other data packet directed to another subscriber station that has the second sector as a home sector.

11. The method of claim 8, further comprising transmitting the first data packet and the second data packet with a modulation and coding scheme that is based on the combined channel quality indicator.

* * * * *